United States Patent [19]

Doherty et al.

[11] Patent Number: 4,484,675

[45] Date of Patent: Nov. 27, 1984

[54] BOARD TURNER APPARATUS AND METHOD CAPABLE OF MULTIPLE TURN INSPECTION

[75] Inventors: Ralph D. Doherty; French O. Weldon, both of Jacksonville, Fla.

[73] Assignee: U. S. Natural Resources, Inc., Portland, Oreg.

[21] Appl. No.: 449,459

[22] Filed: Dec. 13, 1982

[51] Int. Cl.³ .............................................. B65G 47/24
[52] U.S. Cl. .................................. 198/413; 198/403; 414/768
[58] Field of Search ............... 198/403, 413, 402, 410, 198/411, 344; 193/45; 414/758, 768, 770, 780, 781

[56] References Cited

U.S. PATENT DOCUMENTS

| | | | |
|---|---|---|---|
| 2,667,259 | 1/1954 | Parker | 198/403 X |
| 2,940,612 | 6/1960 | Shimeld | 414/780 |
| 3,074,530 | 1/1963 | Rosenleaf | 198/402 |
| 3,247,963 | 4/1966 | Fehely | 198/403 |
| 3,306,427 | 2/1967 | Spencer | 198/404 |
| 3,361,418 | 1/1968 | Fromont et al. | 198/344 X |
| 3,380,570 | 4/1968 | Jordan | 198/403 |
| 3,426,882 | 2/1969 | Korth | 198/404 |
| 3,552,538 | 1/1971 | Triggs et al. | 198/403 |
| 3,887,066 | 6/1975 | Houtsager | 198/403 |

FOREIGN PATENT DOCUMENTS 77895 1/1919 Fed. Rep. of Germany ...... 198/413

OTHER PUBLICATIONS

Advertising brochure of Irvington-Moore entitled "Bulletin No. 6712 Inspection Station Control Center", 4 pages, published Sep. 1972.

Primary Examiner—Robert J. Spar
Assistant Examiner—Jonathan D. Holmes
Attorney, Agent, or Firm—Kolisch, Hartwell, Dickinson & Anderson

[57] ABSTRACT

The board turner apparatus and method is capable of turning a board over several times for repeated inspection of both sides of such board for more accurate grading of such board before allowing the board to be conveyed forward past a retractable stop. The retractable stop means when extended above the conveyor engages the leading edge of the board at a fixed stop position along a conveyor means and keeps the board from advancing along the conveyor means until such stop means is retracted. The board inverter means includes a plurality of curved turner arms which pivot about the axis of a common support shaft between a lowered position below the upper surface of the conveyor and a raised position above such upper conveyor surface. The turner arms engage the leading edge of the board and cause it to pivot backwards about its trailing edge when such turner arms are pivoted from their lowered position to the raised position in an opposite direction to the movement of the conveyor until the board falls backward onto the conveyor, at a location rearwardly of the stop position. In one embodiment, the retractable stop means is a plurality of stop members separate from the inverter arms. However, in a second embodiment, the stop means is provided by stop surfaces in notches on the free ends of the inverter arms which partially project above the surface of the conveyor in the extended position of the stop means, and are moved down below the surface of such conveyor in the retracted position of such stop means.

18 Claims, 5 Drawing Figures

BOARD TURNER APPARATUS AND METHOD CAPABLE OF MULTIPLE TURN INSPECTION

BACKGROUND OF INVENTION

The present invention relates generally to turner apparatus and method for turning flatened elongated articles, such as boards, so that such articles may be inverted several times before they are advanced on a conveyor past such turning apparatus. More specifically, such turning apparatus and method includes a retractable stop means for stopping the elongated article on the conveyor and inverter means including a plurality of turner arms which engage the elongated article and pivot it rearwardly about its rear edge until it falls backward onto the conveyor at a location rearward of the stop position where such article is engaged by the stop means. As a result, the elongated article may be turned over 180° or inverted several times before the stop means is retracted to enable the article to be conveyed forward of such stop means. The turner apparatus and method of the present invention is especially useful for turning boards or panels several times for repeated inspection of both sides of such boards or panels for grading purposes.

Previously board turner apparatus and methods disclosed in U.S. Pat. No. 3,380,570 of Jordan issued Aug. 30, 1968, U.S. Pat. No. 3,426,882 of Korth issued Feb. 11, 1969, U.S Pat. No. 3,552,538 of Triggs et al issued Jan. 5, 1971 and U.S. Pat. No. 3,887,066 of Houtsager issued June 3, 1975 are only capable of single turn inspection because they can only turn over the board through 180° once for inspection of both sides thereof before the board is advanced by a conveyor past the turner apparatus. Thus, these prior board turner apparatus are not capable of turning each board several times for repeated inspections of both sides of the board for more accurate grading, in the manner of the present invention. Furthermore, the turning apparatus employed in such patents is much more complicated, expensive and subject to jamming than that of the present invention. In all of these prior apparatus, the board is pivoted by the turning arms of the inverter means which rotate in the same direction of movement as the conveyor means. As a result, the board is not pivoted about its rear edge to fall backwards onto the conveyor means at a location rearward of a stop position on the conveyor where a retractable stop means engages the leading edge of the board to enable multiple turning of the board, in the manner of the present invention. In addition, none of such prior board turning apparatus employs such an inverter means in combination with a retractable stop means.

The Korth U.S. Pat. No. 3,426,882 and Jordan U.S. Pat. No. 3,380,570 show board turner apparatus including retractable stop means, but the turning arms pivot in the same direction of movement as the conveyor to turn the board so that it falls forward onto the conveyor means at a location forward of the stop position. As a result, multiple turning of the board in the manner of the present invention is impossible. The Triggs et al U.S. Pat. No. 3,552,538 shows a panel turner mechanism which pivots the panel rearwardly by pivoting turning arms. However, there is no retractable stop which engages the leading edge of the panel to stop the panel at a position for multiple turning until the retractable stop is retracted, in the manner of the present invention. Instead, it employs a rear stop arm which engages the trailing edge of the panel when the turning arm raises the panel. Also, a separate support arm is provided above the conveyor against which the panel is moved by the turning arm to keep the panel from falling onto the conveyor at a position rearwardly of the stop arm. Rather than a retractable stop which engages the front edge of the panel, this prior panel turner mechanism employs electrical trip switches to control the cylinder for operating the turning arms when a panel is present, and an electrical circuit for disabeling such trip switches when it is desired to advance the panel.

The Houtsager U.S. Pat. No. 3,887,066 shows an automatic board turner which employs a pair of rotating turner arm wheels which are positioned above the conveyor and rotate in the same direction of movement as the conveyor and engage boards carried by lugs on the conveyor. There is no retractable stop means for stopping advancement of the boards on the conveyor to enable multiple turning of the boards for inspection of both sides of the boad several times, in the manner of the present invention. Thus, the board is not pivoted rearwardly and caused to fall onto the conveyor at a position rearwardly of the stop position where a retractable stop means engages the leading edge of the board, in the manner of the present invention.

Other board inverting mechanisms which do not employ retractable stops or an inverter arm which pivots in an opposite direction to the conveyor to cause the boards to fall backward onto the conveyor at a location rearward of the stop means in the manner of the present invention are U.S. Pat. No. 3,074,530 of Rosenleaf issued Jan. 22, 1963, U.S. Pat. No. 3,247,963 of Fehely issued Aug. 26, 1966 and U.S. Pat. No. 3,306,427 of Spencer issued Feb. 28, 1967.

SUMMARY OF INVENTION

It is therefore one object of the present invention to provide an improved turner apparatus and method for turning flatened elongated articles, such as boards or panels, to enable such articles to be inverted several times before they are conveyed past such turner apparatus, for repeated inspection of both sides of the article and more accurate grading.

Another object of the invention is to provide such a turner apparatus and method of simple and reliable operation in which a retractable stop means engages the leading edge of the elongated article at a stop position on a conveyor means to stop the article from advancing, and a plurality of turner arms forming an inverter means pivot in an opposite direction to the conveying direction of the conveyor means and engage the article adjacent its front edge to cause the article to pivot rearwardly about its rear edge and to fall backward onto the conveyor at a location rearwardly of the stop position, thereby enabling multiple turning of the article until the stop means is retracted.

A further object of the invention is to provide such a turner apparatus and method of fast, accurate and jam-free operation in which the inverter means for turning the article pivots about an axis beneath the conveyor and the turning arms pivot upward from a lowered position below the upper surface of the conveyor until they engage the article adjacent to the leading edge thereof and turn the article over by continued upward movement of such turning arms to a raised position above the conveyor, such turning arms being curved to prevent jamming by engagement with the articles during return of the turning arms to the lowered position from the raised position.

An additional object of the invention is to provide such a turner apparatus and method in which a plurality of such turner arms are spaced transversely across the width of the conveyor means and a plurality of retractable stop means are provided adjacent such turner arms, one stop means for each of the turner arms, in order to turn boards of different length.

Still another object of the present invention is to provide such a turner apparatus and method of fast operation in which the retractable stop means are a plurality of stop members separate from the turner arms and operate independently of such turner arms.

A still further object of the invention is to provide such a turner apparatus and method in which the retractable stop means is provided integral with the turner arms, such turner arms having stop surface provided on their free ends and extending above the upper surface of the conveyor in a stop position to engage the leading edge of the boards.

DESCRIPTION OF DRAWINGS

Other objects and advantages of the present invention will be apparent from the following detailed description of preferred embodiments thereof and from the attached drawings of which.

DESCRIPTION OF PREFERRED EMBODIMENTS

Figure 1:
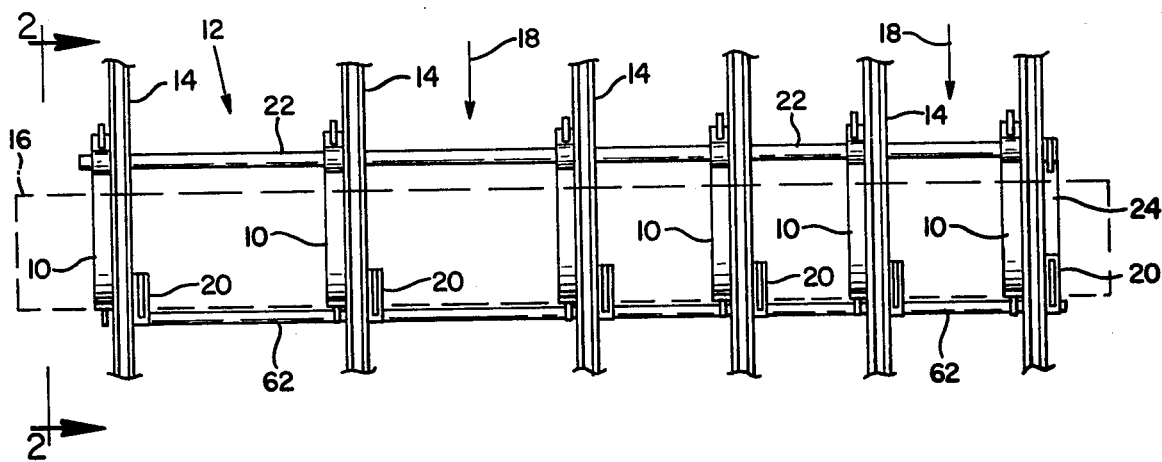
FIG. 1 is a plan view of the top of a board turner apparatus in accordance with the present invention.

As shown in FIG. 1, the board turner apparatus of the present invention includes a board inverter means formed by a plurality of curved turner arms 10 spaced transversely across a board conveyor 12. The conveyor 12 includes a plurality of conveyor chains 14 driven at a speed of approximately 50 to 100 feet per minute which engage the bottom surfaces of a plurality of boards 16 of lumber for conveying each of such boards in a direction transverse to its longitudinal axis or length in the direction of arrows 18. It should be noted that board 16 could be a different flatened elongated article, such as a panel of plywood or gypsum board. Adjacent to each of the turner arms 10 is a retractable stop means including a pivoted stop member 20 for stopping the forward advance of board 16 on the conveyor chains 14 when such stop member is extended above such chains.

Figure 2A:
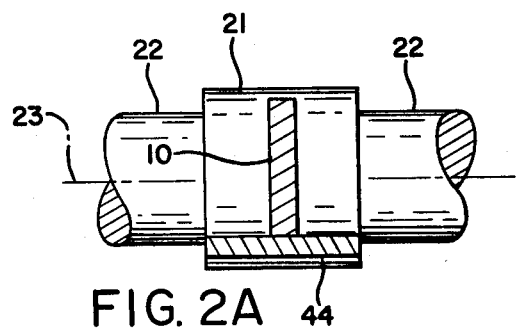
FIG. 2A is an enlarged section view taken along line 2A—2A of FIG. 2.
Figure 2:
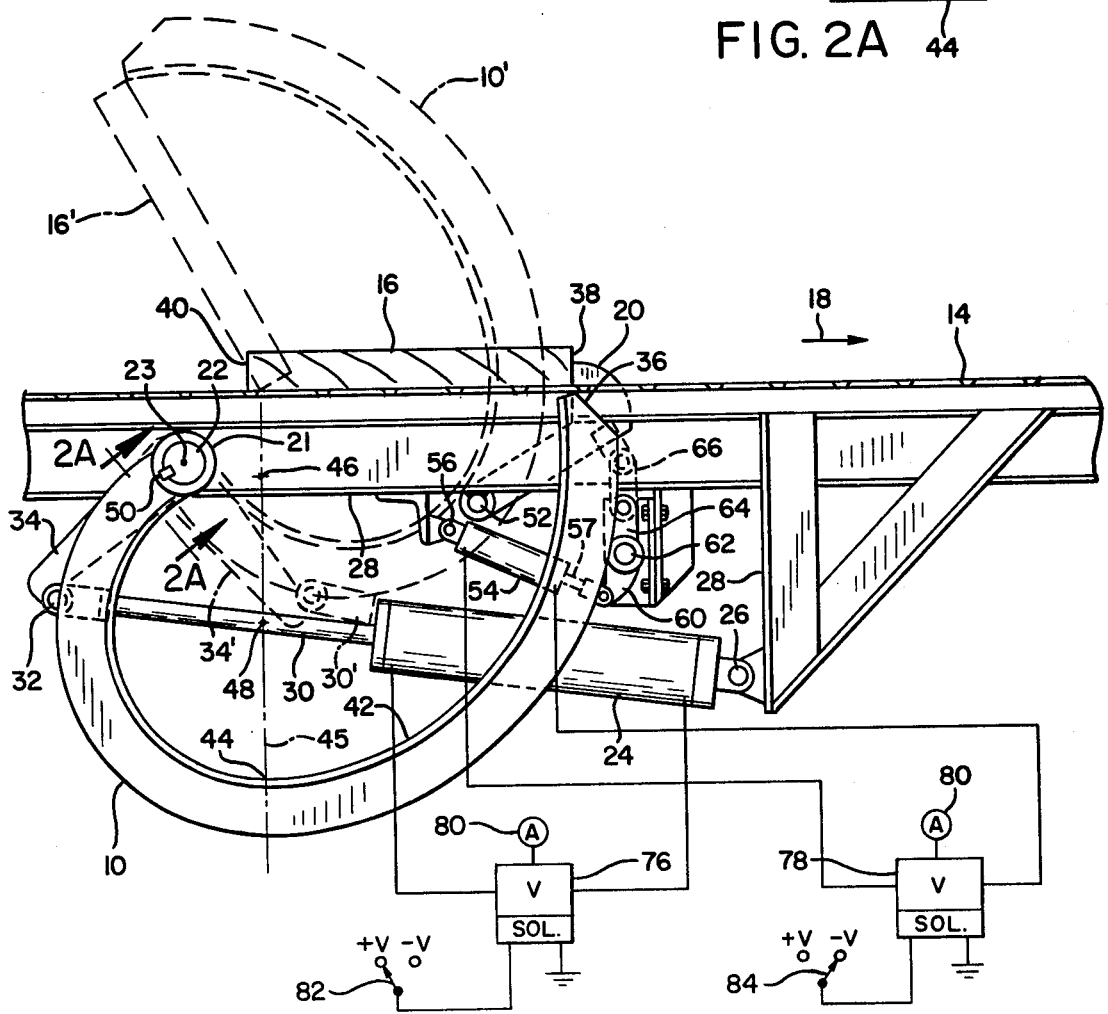
FIG. 2 is an enlarged vertical section view taken along the line 2—2 of FIG. 1 showing one embodiment of the turner apparatus and retractable stop means.

As shown in FIG. 2, each of the turner arms 10 is attached at a pivot end 21 to a common support shaft 22 for pivoting with such support shaft about the axis 23 of the shaft located below the upper surface of the conveyor chains 14 when such support shaft is rotated by an operating cylinder 24. The cylinder 24 may be an air cylinder which is pivotally connected at one end by a pivot connection 26 to a fixed support frame 28 for the conveyor chains 14. The piston rod 30 of cylinder 24 is attached by a pivot connection 32 at the outer end thereof to a lever 34 which is fixed to the shaft 32 for rotation of such shaft. Thus, when the piston rod is moved from the solid line extended position 30 to the dashed line retracted position 30', the common support shaft 22 is rotated counter clockwise thereby pivoting the turner arms 10 upward into the dashed line raised position 10'. This causes the free end 36 of the turner arm 10 to engage the bottom of board 16 adjacent the front edge 38 of such board and to pivot the board upward and backward about its rear edge 40 into a raised position 16' shown in dashed lines slightly rearward of a vertical position. From the raised position 16', the board falls downward into contact with the conveyor chains 14 at a location rearwardly of the stop position where its front edge 38 is engaged by extended stop members 20. This enables the board to be turned 180° or inverted several times until the stop members are retracted, for repeated inspection of both sides of the board and more accurate grading.

The turner arms 10 are curved upwardly from their pivoted end 21 toward their free end 36 in the lowered position of such arms below the conveyor chains 14. The contact surface 42 of each turner arm 10 which engages the board is a compound convex curved surface which is not provided with a uniform radius of curvature along the entire length of such surface. Thus, in one example, the radius of curvature of the contact surface 42 of the turner arm 10 is 17 inches for the outer portion extending from the free end 36 of such turner arm through an angle of about 110° to an intermediate point 44. The center 46 of such radius of curvature lies along a vertical line 45 which passes through the intermediate point 44 and such center 46 is spaced 3 and 5/16 inches horizontally to the right from the axis 23 of shaft 22. The inner portion of the contact surface 42 of the turning arm 10 extending between intermediate point 44 and the pivoted end 21 of the turner arm 10 has a radius of curvature of 8⅛ inch and extends through an angle of 156°, 30 minutes about a center of curvature 48 located on vertical line 45 halfway between point 44 and point 46.

The primary reason for the curvature of the contact surface 42 of the turner arms 10 is to prevent such turner arms from jamming on the board when they return from the raised position 10' to the lowered position 10 in the event that such inner surface 42 comes into contact with board 16 before the turning arm is completely lowered.

It should be noted that each of the turner arms 10 forming the inverting means for inverting the board 16 by turning such board to an angle of 180° is fixed at one end to the common support shaft 22 by a key insert 50. As a result, all of the turner arms 10 pivot together when support shaft 22 is rotated by cylinder 24.

Each of the stop members 20 is pivotally mounted on a different pivot pin 52 fixed to the frame 28. Thus, the stop members pivot about such pivot pins between the extended position 20 shown in FIG. 2 and the retracted position 20' of FIG. 3. In the extended position of the stop member 20, the free end of the stop member extends above the upper surface of the conveyor chain 14 into engagement with the front edge 38 of the board 16 to stop further advancement of the board when such board is conveyed into the stop position shown in FIG. 2. The stop member 20 is pivoted downward from the extended position 20 of FIG. 2 by an operating cylinder 54 to the retracted position 20′ of FIG. 3 in which the free end of the stop member is located below the upper surface of the conveyor chain 14. In the retracted position 20′ of the stop member, the board 16 is released so that it can be advanced forwardly by the conveyor chain 14 past the stop member downstream to a suitable sorting device (not shown).

Figure 3:
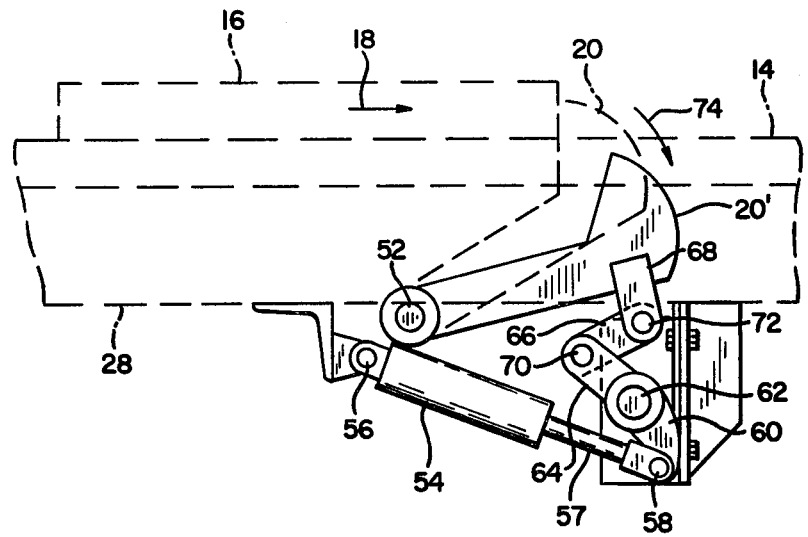
FIG. 3 is an enlarged view of a portion of the apparatus of FIG. 2 showing the stop member in the retracted position.

As shown in FIG. 3, one end of the cylinder 54, which may be an air cylinder, is pivoted by a pivot connection 56 to the frame 28, and the piston rod 57 of such cylinder is pivoted at its outer end by a pivot connection 58 to a lever arm 60 which is fixedly attached to a common actuation shaft 62 for rotation of such shaft in response to movement of the piston rod 57. The common actuation shaft 62 has a plurality of stop actuation arms 64 attached at positions spaced longitudinally along such shaft adjacent the stop members 20. Each of the stop actuation arms 64 is connected by a coupling link member 66 to a stop extension arm 68 fixedly attached to the stop members 20. Thus, the coupling member 66 is connected by two pivot connections 70 and 72 at the opposite ends thereof to actuation arm 64 and stop extension arm 68, respectively, to couple the rotational movement of the common actuation shaft 62 to each of the stop members 20. As a result, outward movement of the piston rod 57 into the extended position shown in FIG. 3 causes counter clockwise rotation of the actuation shaft 62 and actuation arm 64, and such movement is coupled through coupling member 66 to the stop member extension arm 68 to rotate the stop members 20 downward in clockwise direction of arrow 74 about the support pins 52, thereby moving the stop members from the extended position 20 to the retracted position 20′ of FIG. 3.

The turner arm actuation cylinder 24 and the stop actuation cylinder 54 are double-acting air cylinders which may be controlled by separate solenoid valves 76 and 78, respectively, as shown in FIG. 2. Each solenoid valve is connected to the same source of pressurized air 80 which is transmitted through the valve to one of the opposite ends of the cylinders 24 and 54 depending upon the position of the valves 76 and 78. Valve 76 is controlled by a first two-position electrical switch 82 which is moved between the +V and −V voltage positions to actuate the solenoid and cause the valve to move in opposite directions depending on the polarity of the voltage applied to such solenoid. Thus, in the +V position of switch 82 shown in FIG. 2, the solenoid valve 76 is actuated so as to move the piston rod of the actuation cylinder 24 to the extended position 30 which rotates the turner arm to the lowered position 10. However, in the −V position of the first switch 82, the solenoid moves the valve 76 to move the piston rod into the retracted position 30′ which causes rotation of the turner arm upward into the raised position 10′.

Similarly, the solenoid valve 78 for the stop operation cylinder 54 is controlled by a second two-position electrical switch 84 which moves between the +V and −V positions shown in FIG. 2 to actuate the solenoid and cause it to move the valve in opposite directions. Thus, in the −V position of the second switch 84, the solenoid valve 78 retracts the piston rod 57 of cylinder 54 into the position shown in FIG. 2, thereby raising the stop member 20 into the extended position shown. However, when the second switch 84 is moved to the +V position, the solenoid valve 78 causes the piston rod 57 of the cylinder 54 to extend into the position shown in FIG. 3, thereby lowering the stop member into the retracted position 20′ shown in FIG. 3.

It should be noted that the two switches 82 and 84 and the associated solenoid valves 76 and 78 provide independent operation of cylinders 24 and 54 so that the turner arms 80 and the stop members 20 may be raised and lowered independently of each other. This enables the stop member 20 to be maintained in the extended position shown in FIG. 2 while the turner arms 10 are moved back and forth several times between the lowered position 10 and the raised position 10′ to turn over or invert the same board 16 several times to enable inspection of both sides of the board repeatedly before the stop 20 is lowered. This multiple turning of the board enables the person operating the board turner apparatus to grade the board more accurately since he can observe both sides of the board several times before releasing the board by retracting stop 20.

Figure 4:
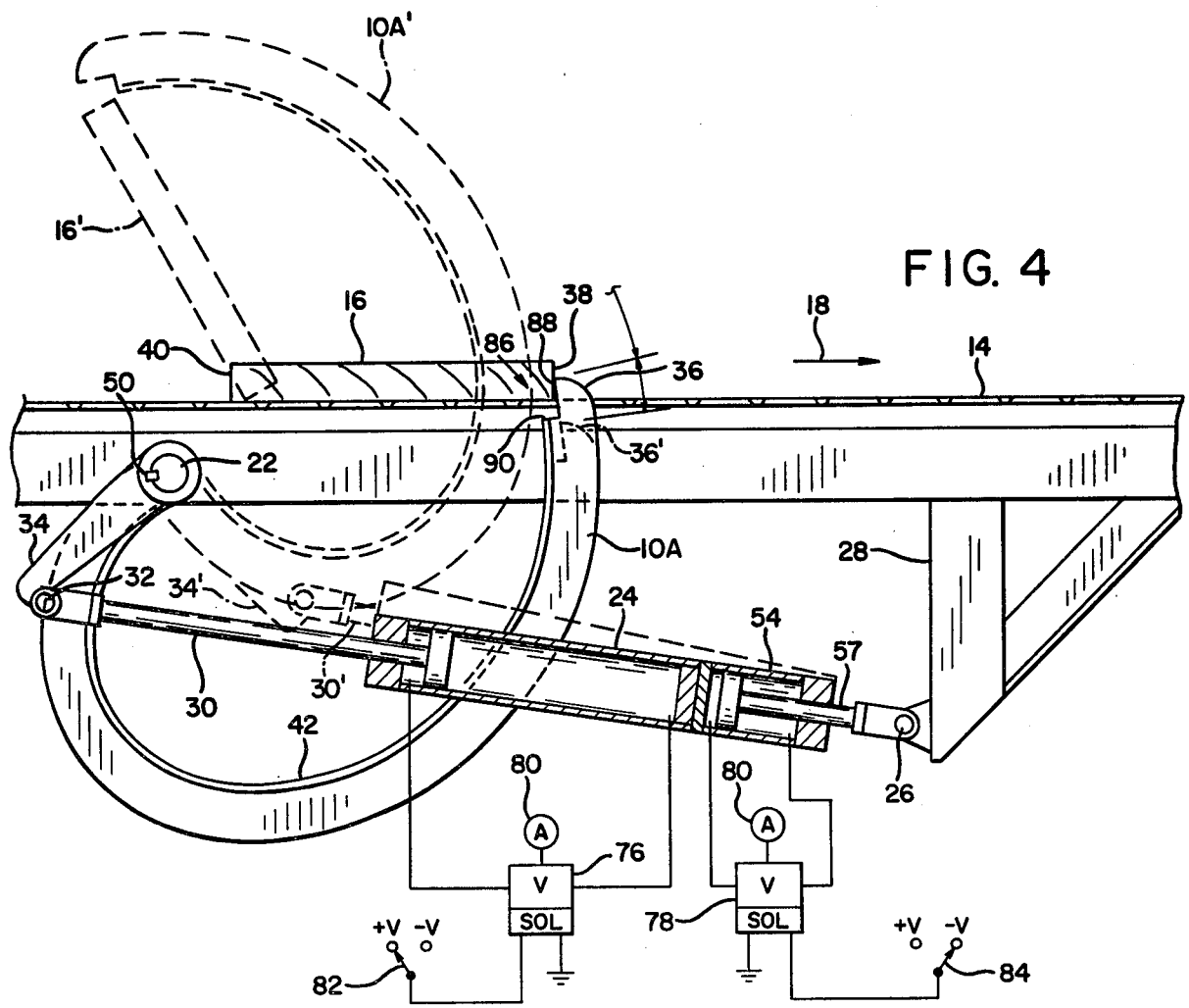
FIG. 4 is an enlarged vertical section view similar to FIG. 2 but showing a second embodiment of the turner apparatus of the present invention in which the stop means is integral with the turner arm.

Another embodiment of the board turner apparatus of the present invention is shown in FIG. 4 which is similar to that of FIGS. 2 and 3 so that the same reference numerals have been used to designate like parts, and only the differences between these two embodiments will be described with respect to FIG. 4.

The turner arms 10A have each been modified by providing a notch 86 at the free end 36 in the contact surface 42. A substantially vertical stop surface 88 of notch 86 serves as the stop means by engaging the front end 38 of the board 16 in the stop position 10A of the arms shown by solid lines in FIG. 4 where the free end 36 extends slightly above the upper surface of the conveyor chain 14. In addition, the notch 86 in the free end 36 of the turner arm 10 also provides a substantially horizontal turning contact surface 90 which engages the bottom of the board 16 adjacent the front end 38 of such board, and pivots the board rearwardly about its rear edge 40 when such turner arm is moved into the raised position 10A′ shown in FIG. 4. Of course, when the board reaches the raised position 16′ slightly rearwardly of its vertical position, the board then falls by gravity backward onto the surface of the conveyor 14 at a location rearward of the stop position where the stop surface 88 engages the front edge of the board. After turning the board, the turner arm is rapidly lowered from the raised position 10A′ to the extended position 10A of FIG. 4 where stop surface 88 again engages the front edge 38 of the board to stop further advancement of the board.

When it is desired to retract the stop means 88 of FIG. 4 to release the board 16 so that it may advance past the stop means, the stop operation cylinder 54 is actuated to extend the piston rod 57 thereby further rotating the turner arms 10A in a clockwise direction to lower the free end 36 of such turner arms into the retracted position 36′ shown in dashed lines below the upper surface of the conveyor chain 10. In this retracted position of the modified turner arm, boards 16 can be transmitted past the stop 88 and on down the conveyor to the sorting apparatus (not shown). It should be noted that the stop operation cylinder 54 is fixed to and in axial alignment with the turner operation cylinder 24 in the embodiment of FIG. 4 so that outward movement of the piston rod 57 of cylinder 54 causes the piston rod 30 of cylinder 24 to be extended further from the pivot point 26 of the cylinder assembly on frame 28. This rotates the lever arm 34 clockwise a short distance thereby rotating the common acutating shaft 22 and the turner arm from the position 10A clockwise to the retracted position where its free end 36' is positioned below the upper surface of the conveyor. However, the two actuation cylinders 24 and 54 are still independently operated by the solenoid valves 76 and 78, respectively, in the manner as that of FIG. 2.

With either of the turner apparatus of FIGS. 2 and 4, the method of turning a flat elongated article, such as a board or panel, in accordance with the present invention includes the steps of conveying the elongated article or board on a conveyor means 14 in a direction 18 transverse to the longitudinal axis or length of the article and stopping the forward conveying movement of the board at a stop position along the conveyor by extending a stop means 20 or 88 into engagement with the front end of the board. Then the stopped board is turned over or inverted by pivoting it about its rear edge 40.

The board is engaged by the turner arms 10 or 10A adjacent the front edge 38 thereof to pivot the board about its rear edge 40 past a vertical position until it falls backward onto the upper surface of the conveyor at a location rearward of the stop position. This enables multiple turning of the board to an angle of 180° to invert the board several times for repeated inspection of opposite sides of the board before the stop means is retracted to release the board for conveying past the turner apparatus. After visual inspection of both sides of the board or other elongated article and grading of the board is completed, the stop means 20 or 88 is lowered into the retracted position below the first surface of the conveyor thereby releasing the board for further advancement by the conveyor. It should be noted that the turner arms 10 are pivoted about the axis of the common actuation shaft 22 which is located below the upper surface of the conveyor. Also, during turning movement of the board, the turner arms 10 pivot in a direction opposite to that of the conveying direction 18. When using a conveyor speed between 50 to 100 feet per minute for conveying chains 14, the turner apparatus and method of the present invention it can turn a maximum of approximately 20 boards per minute.

It will be obvious to those having ordinary skill in the art that many changes may be made in the above-described preferred embodiments of the invention. Therefore, the scope of the present invention should be determined by the following claims.

We claim:

1. A board turning apparatus, comprising:
   conveyor means for conveying a plurality of boards in a direction transverse to the lengths of the boards;
   retractable stop means for engaging the front edge of one of the boards at a fixed stop position on said conveyor means to stop forward movement of the board in an extended position of said stop means, and for releasing the board to enable said board to be moved forward by said conveyor means past said stop means in a retracted position of said stop means;
   inverter means for inverting the boards by lifting the front edge of the board upward after said board is engaged by said stop means in said extended position and causing the board to turn over by pivoting the board about its rear edge 180 degrees until it falls backward onto the conveyor means at a location rearward of the stop position to invert the position of the board so that both sides of said board may be inspected; and
   control means for controlling said inverter means and said stop means to enable said inverter means to invert each board several times before said stop means is moved to said retracted position to allow said board to be advanced forward beyond said stop means by said conveyor means.

2. An apparatus in accordance with claim 1 in which the inverter means includes a plurality of turner arms spaced across the conveyor means which pivot about pivot axis below the upper surface of the conveyor means between a lowered position where the free ends of the turner arms are below the upper surface of the conveyor and a raised position where the free ends of the turner arms are above said upper conveyor surface to invert said boards.

3. An apparatus in accordance with claim 2 in which the turner arms engage the board and pivot in an opposite direction to movement of the conveyor to invert the board.

4. An apparatus in accordance with claim 2 in which the turner arms are curved from their pivoted ends toward their free ends upward toward the top of the conveyor means in the lowered position of said arms.

5. An apparatus in accordance with claim 2 in which the stop means is provided by the turner arms in a stop position of said arms where their free ends extend partially above the conveyor means to engage the boards and release the boards in a retracted position of said arms with their free ends below the conveyor means.

6. An apparatus in accordance with claim 1 in which the conveyor means conveys the boards substantially horizontally to said fixed stop position where it is engaged by said stop means and said inverter means.

7. An apparatus in accordance with claim 1 in which the control means includes separate actuation means for the inverter means and for the stop means.

8. An apparatus in accordance with claim 1 in which the inverter means includes a plurality of pivoting turner arms spaced across the conveyor means and the stop means includes a plurality of retractable stop members separate from said turner arms and positioned adjacent said arms.

9. An apparatus in accordance with claim 8 in which the turner arms and the stop members are pivotally mounted below the upper surface of the conveyor means and the control means include first cylinder means for pivoting the inverter arms and second cylinder means for pivoting the stop members.

10. Elongated article turning apparatus, comprising:
    conveyor means for conveying a plurality of elongated articles in a direction transverse to the lengths of the articles;
    retractable stop means for engaging the front edge of one of the articles on the conveyor means to stop forward movement of the article at a stop position along the conveyor in an extended position of said stop means, and for releasing the article to enable said article to be moved forward by said conveyor means past said stop means in a retracted position of the stop means;
    inverter means for turning the articles by lifting the front edge of the article upward after said article is stopped by said stop means and causing the article to turn about its rear edge and fall backward onto the conveyor means at a location rearward of the stop position to turn the article so that all sides of the article may be inspected; and control means for controlling said inverter means and said stop means to enable said inverter means to turn the article several times before the stop means is moved to said retracted position.

11. Apparatus in accordance with claim 10 in which the inverter means includes a plurality of turner arms which are spaced across the conveyor means and which pivot about a pivot axis below the upper surface of the conveyor means to move the free ends of the turner arms up above said upper conveyor surface to turn the articles and down below said conveyor surface.

12. Apparatus in accordance with claim 11 in which the turner arms engage the articles and pivot in an opposite direction to the movement of the conveyor means to turn the articles.

13. Apparatus in accordance with claim 10 in which the inverter means includes a plurality of turner arms which are spaced across the conveyor means and the stop means includes a plurality of retractable stop members positioned adjacent said turner arms.

14. Apparatus in accordance with claim 10 in which the turner means includes a plurality of pivoted turner arms which are curved from their free ends toward pivoted ends.

15. Apparatus in accordance with claim 14 in which the curved turner arms are provided with notches at their free ends including stop surfaces which engage the front edge of the board in an extended position of said arms to form the stop means.

16. A method of turning a board comprising the steps of:
    conveying a plurality of boards on a conveyor means in a direction transverse to the lengths of the boards;
    stopping the forward conveying movement of a board at a stop position along the conveyor means by engaging the front end of the board with retractable stop means;
    turning the stopped board by engaging the board adjacent its front edge with pivoted turner arms and pivoting said turner arms in a direction opposite to the conveying movement of the board to lift said front edge upward to pivot the board about its rear edge until the board falls backward into the inverted position; and
    selectively releasing the stopped board by retracting said stop means from engagement with the board to enable it to be conveyed forward after turning said board.

17. A method in accordance with claim 16 in which the turner arms and the stop means are separate members which are operated independently of each other to enable the stopped board to be turned several times before the stop members are retracted.

18. A method of turning a board comprising the steps of:
    conveying a plurality of boards on a conveyor means in a direction transverse to the lengths of the boards;
    stopping the forward conveying movement of a board at a stop position along the conveyor means by extending a stop means into engagement with the board;
    turning the stopped board by pivoting it backward about its rear edge and causing it to fall onto the conveyor means at a location rearward of the stop position to invert the position of said board;
    repeating the turning operation; and
    selectively releasing the stopped board by retracting the stop means from engagement with the board to enable it to be conveyed forward after turning said board.

* * * * *